United States Patent [19]

Longhurst

[11] Patent Number: 5,090,802
[45] Date of Patent: Feb. 25, 1992

[54] OPTICAL MEASUREMENT SYSTEM

[75] Inventor: Philip C. Longhurst, Tarporley, England

[73] Assignee: BICC, plc, London, United Kingdom

[21] Appl. No.: 562,277

[22] Filed: Aug. 3, 1990

[30] Foreign Application Priority Data

Aug. 3, 1989 [GB] United Kingdom ............... 8917737

[51] Int. Cl.$^5$ ...................... G01N 21/84; G01N 21/59
[52] U.S. Cl. ............................................ 356/73.1
[58] Field of Search ........................................ 356/73.1

[56] References Cited

U.S. PATENT DOCUMENTS 4,409,476 10/1983 Lofgren et al. ...................... 356/44
4,445,086 4/1984 Bulatao ............................... 356/73.1

Primary Examiner—Vincent P. McGraw
Attorney, Agent, or Firm—Oliff & Berridge

[57] ABSTRACT

An optical measurement system is disclosed which enables rapid and repeatable measurement of insertion and return loss of each fiber in sequence of a multi-fiber connector 15 connected to an optical fiber ribbon 16 to be obtained without disturbing either the light source 17, 18 or detector components 19, 20 of the system. The system comprises a multi-channel optical switch 1 for connection to a light source 17, 18; 1×2 bi-directional splitters 2 each of which is optically coupled between one of the channels of the multi-channel optical switch and one fiber of a master multi-fiber connector 3, of which the geometry is known, for mating with a multi-fiber connector to be tested and, for connection to at least one detector for monitoring and recording the power reflected at the interface between a pair of optical fibers interconnected by the mating of the master multi-fiber connector and the multi-fiber connector under test, and a splitter 11 to which each of the bi-directional splitters 2 is also optically coupled.

18 Claims, 1 Drawing Sheet

# OPTICAL MEASUREMENT SYSTEM

BACKGROUND OF THE INVENTION

This invention relates to an optical measurement system for determining the performance of a multi-fibre connector which is connected to an optical fibre ribbon and which is suitable for incorporation in a subscriber network.

Two parameters generally used to determine the optical performance of a multi-fibre connector coupled to a length of optical fibre ribbon are the insertion loss and the return loss of each fibre in the connector. The insertion loss of an optical fibre in a connector when the optical fibre is connected to a fibre in another multi-fibre connector and the two multi-fibre connectors are mated together is defined as the proportion of input power that is transmitted along the output fibre. The return loss of an optical fibre in a multi-fibre connector when the optical fibre is connected to a fibre in another multi-fibre connector and the two multi-fibre connectors are mated together is defined as the proportion of input power that is returned along the input fibre due to reflection at the interface of the connected pair of fibres.

OBJECTS AND SUMMARY OF THE INVENTION

It is an object of the present invention to provide an improved optical measurement system by means of which can be obtained rapid and repeatable measurements of insertion and return loss of each fibre in sequence of a multi-fibre connector which is connected to an optical fibre ribbon and which is suitable for mating with a multi-fibre connector of complementary form, which measurements can be achieved without disturbing either the light source or the detector components of the system.

According to the invention, the improved optical measurement system comprises a multi-channel optical switch suitable for connection to a source of light; a plurality of 1×2 bi-directional splitters each of which is directly optically coupled between one of the channels of the switch and one fibre of a master multi-fibre connector as hereinafter defined for mating with a multi-fibre connector to be tested and, for connection to at least one detector for monitoring and recording the power reflected at the interface between a pair of optical fibres interconnected by the mating of the standard multi-fibre connector and the multi-fibre connector under test, and a splitter to which each of said bi-directional splitters is also optically coupled.

By a master multi-fibre connector is meant a multi-fibre connector of which the geometric and optical characteristics are clearly defined.

For monitoring and recording the insertion loss of the optical fibres of a multi-fibre connector, the connector under test is mated to the master connector and the opposite end of the optical fibre ribbon connected to the connector under test is mated to at least one detector. For measurement of return loss of these optical fibers, the end of the optical fibre ribbon mated to said detector or detectors is unmated and so terminated that no light is reflected from this end, e.g. by a cell containing index matching liquid or semi-liquid.

By means of the multi-channel optical switch each optical fibre in turn of the optical fibre ribbon connected to the multi-fibre connector under test can be tested to determine both its insertion loss and its return loss without disturbing either the light source or the detectors. Operation of the system may be effected manually but preferably the system is operated automatically under the control of a microprocessor.

Each detector preferably includes means for automatic collation and analysis of the data received and recorded.

The multi-channel optical switch preferably is suitable for connection to any one of at least two sources of light of wavelengths differing from one another, e.g. 1310 nm and 1550 nm, and in this case the splitter to which all the bi-directional splitters are optically coupled is preferably suitable for connection to at least two detectors, each appropriate to one of the sources of light.

BRIEF DESCRIPTION OF THE DRAWINGS

The invention is further illustrated by a description, by way of example, of a preferred optical measurement system for obtaining rapid and repeatable measurements of insertion and return loss of each fibre in sequence of a multi-fibre connector which is connected to an optical fibre ribbon and which is suitable for mating with a multi-fibre connector of complementary form, with reference to the accompanying drawings, in which.

DETAILED DESCRIPTION OF THE PREFERRED EMBODIMENT

Figure 1:
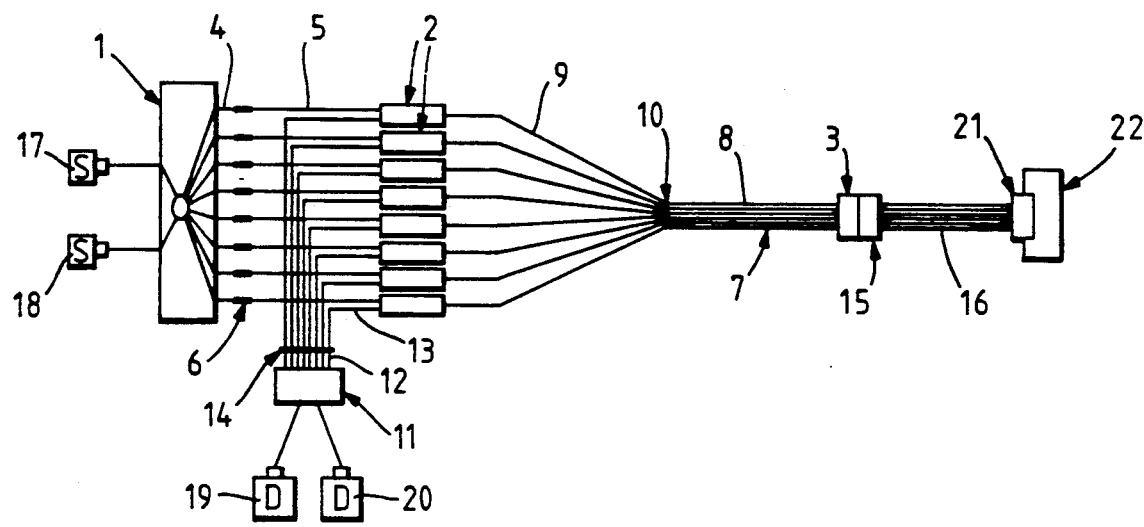
FIG. 1 is a diagrammatic representation of the preferred system connected for obtaining measurements of insertion loss of each fibre in sequence of the multi-fibre connector under test.
Figure 2:
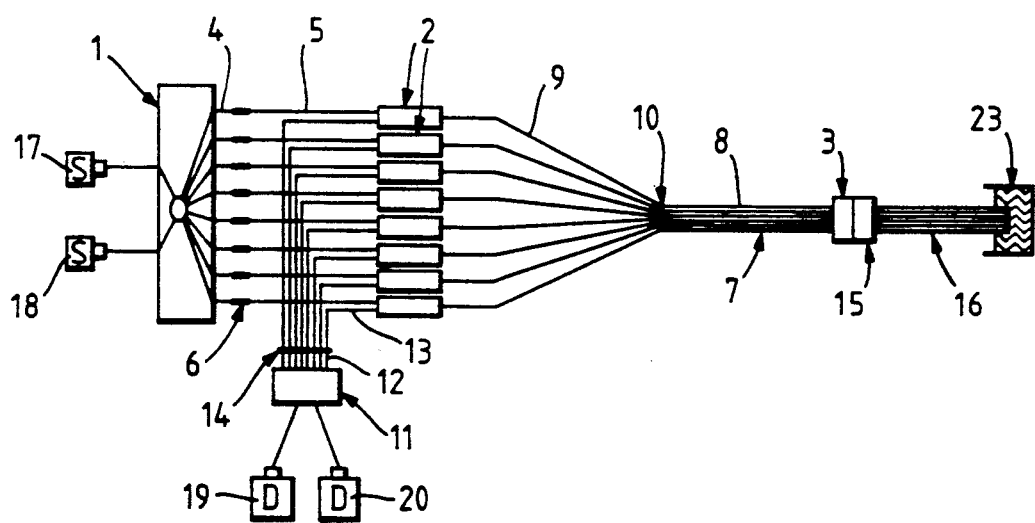
FIG. 2 is a diagrammatic representation of the preferred system connected for obtaining measurements of return loss of each fibre in sequence of the multi-fibre connector under test.

Referring to FIGS. 1 and 2, the preferred optical measurement system comprises a multi-channel optical switch 1, eight 1×2 bi-directional splitters 2, a master multi-fibre connector 3 of which the geometry is known and a splitter 11 common to the bi-directional splitters. Each bi-directional splitter 2 is directly optically coupled to one of the channels 4 of the switch 1 by an optical fibre 5 which is fusion spliced at 6 to the channel and to one of the fibres 8 of an optical fibre ribbon 7 connected to the master connector 3 by an optical fibre 9 which is fusion spliced at 10 to said optical fibre. Each of the bi-directional splitters 2 is also optically coupled to one optical lead 12 of a splitter 11, common to the bi-directional splitters, via an optical fibre 13 which is fusion spliced at 14 to the optical lead.

The optical switch 1 can be connected to either of two sources 17 and 18 of light, one having a wavelength of 1310 nm and the other having a wavelength of 1550 nm. The splitter 11 to which all the bi-directional splitters 2 are optically coupled can be connected to either of two detectors 19 and 20, each appropriate to one of the sources 17 and 18 of light.

As will be seen on referring to FIG. 1, when using the optical measurement system for monitoring and recording the insertion loss between a pair of optical fibres interconnected by the mating of the standard multi-fibre connector 3 and a multi-fibre connector 15 under test, optical fibres of the optical fibre ribbon 16 connected to the multi-fibre connector 15 under test are terminated by an adaptor 21 optically coupling the multi-fibre connector under test to a large area detector 22.

As will be seen on referring to FIG. 2, when using the optical measurement system to monitor and record the return loss between the pair of optical fibres interconnected by the mating of the standard multi-fibre connector 3 and the multi-fibre connector 15 under test, the adaptor 21 is disconnected from the large area detector 22 and is removed from the end of the optical fibre ribbon 16 and the free end of the optical fibre ribbon is immersed in an index matching gel 23 from which no light will be reflected.

In use, before connecting up the optical measurement system as shown in FIGS. 1 and 2, the master connector 3 is connected direct to the large area detector 22 and values for reference power $P_1$ for each fibre are recorded at both wavelengths by switching through each channel in sequence. Then, with the optical measurement system connected as shown in FIG. 1, the values of transmitted power $P_2$ are recorded for each path in turn at both wavelengths. With the optical measurement system then connected as shown in FIG. 2, returned power values $P_3$ for each path are recorded at both wavelengths.

The insertion loss of each fibre path through the connector 15 under test is found from the equation:

$$Insertion\ Loss = P_2 - P_1\ dB$$

The return loss for each fibre path through the connector 15 under test is found from the equation:

$$Return\ Loss = P_3 - P_1 - X_n\ dB$$

where $X_n$ is the loss through the system travelled by the returned power, i.e. the loss through the couplers and fusion splices. This value can be calculated for each path in the system.

What is claimed is:

1. An optical measurement system by means of which can be obtained rapid and repeatable measurements of insertion and return loss of each fibre in sequence of a multi-fibre connector which is connected to an optical fibre ribbon and which is suitable for mating with a multi-fibre connector of complementary form, which optical measurement system comprises:
   a multi-channel optical switch for connection to a source of light;
   a plurality of 1×2 bi-directional splitters each of which is directly optically coupled between one of the channels of the multi-channel optical switch and one fibre of a master multi-fibre connector for mating with a multi-fibre connector to be tested and, for connection to at least one detector for monitoring and recording the power reflected at the interface between a pair of optical fibres interconnected by the mating of the master multi-fibre connector and the multi-fibre connector under test; and
   a common splitter to which each of said bi-directional splitters is also optically coupled.

2. An optical measurement system as claimed in claim 1, wherein the optical fibre ribbon connected to the multi-fibre connector under test is optically coupled to at least one detector for monitoring and recording the insertion loss between said pair of optical fibres.

3. An optical measurement system as claimed in claim 1, wherein the optical fibre ribbon connected to the multi-fibre connector under test is terminated by means for reflecting no light.

4. An optical measurement system as claimed in claim 3, wherein said means for reflecting no light is an index matching liquid contained in a cell.

5. An optical measurement system as claimed in claim 3, wherein said means for reflecting no light is an index matching semi-liquid contained in a cell.

6. An optical measurement system as claimed in claim 1, further comprising a microprocessor for automatically operating said system.

7. An optical measurement system as claimed in claim 2, further comprising:
   at least one detector, optically coupled to said common splitter, for monitoring and recording the power reflected at the interface between said pair of optical fibres interconnected by the mating of the master multi-fibre connector and the multi-fibre connector under test connected to the common splitter, and wherein each detector of the system includes means for automatic collation and analysis of data received and recorded.

8. An optical measurement system as claimed in claim 1, wherein said multi-channel optical switch includes means for connection to any one of at least two sources of light of wavelengths differing from one another.

9. An optical measurement system as claimed in claim 8, wherein said common splitter includes means for connection to at least two detectors, each appropriate to one of said at least two sources of light.

10. An optical measurement system by means of which can be obtained rapid and repeatable measurements of insertion and return loss of each fibre in sequence of a multi-fibre connector which is connected to an optical fibre ribbon and which is suitable for mating with a multi-fibre connector of complementary form, which optical measurement system comprises:
    a multi-channel optical switch including means for connection to a source of light;
    a master multi-fibre connector for mating with a multi-fibre connector to be tested and having a plurality of fibres connected thereto;
    a plurality of 1×2 bi-directional splitters, each of which is directly optically coupled between one of said plurality of fibres connected to said master multi-fibre connector and one of said channels of said multi-channel optical switch;
    a common splitter optically coupled to each of said bi-directional splitters; and
    at least one detector for monitoring and recording the power reflected at the interface between a pair of optical fibres interconnected by said master multi-fibre connector and the multi-fibre connector under test, said at least one detector being attached to said common splitter.

11. An optical measurement system as claimed in claim 10, wherein the optical fibre ribbon connected to the multi-fibre connector under test is optically coupled to at least one detector for monitoring and recording the insertion loss between said pair of optical fibres.

12. The optical measurement system as claimed in claim 11, wherein each detector of the system incudes means for automatic collation and analysis of data received and recorded.

13. An optical measurement system as claimed in claim 10, wherein the optical fibre ribbon connected to the multi-fibre connector under test is terminated by means for reflecting no light.

14. An optical measurement system as claimed in claim 13, wherein said means for reflecting no light is an index matching liquid contained in a cell.

15. An optical measurement system as claimed in claim 13, wherein said means for reflecting no light is an index matching semi-liquid contained in a cell.

16. An optical measurement system as claimed in claim 10, further comprising a microprocessor for automatically operating said system.

17. An optical measurement system as claimed in claim 10, wherein said multi-channel optical switch includes means for connection to any one of at least two sources of light of wavelengths differing from one another.

18. An optical measurement system as claimed in claim 17, wherein said common splitter includes means for connection to at least two detectors, each appropriate to one of said at least two sources of light.

* * * * *